April 16, 1935.  J. W. WYLLIE  1,997,783
AUTOMATIC STOPPING DEVICE
Filed May 17, 1929   3 Sheets-Sheet 1
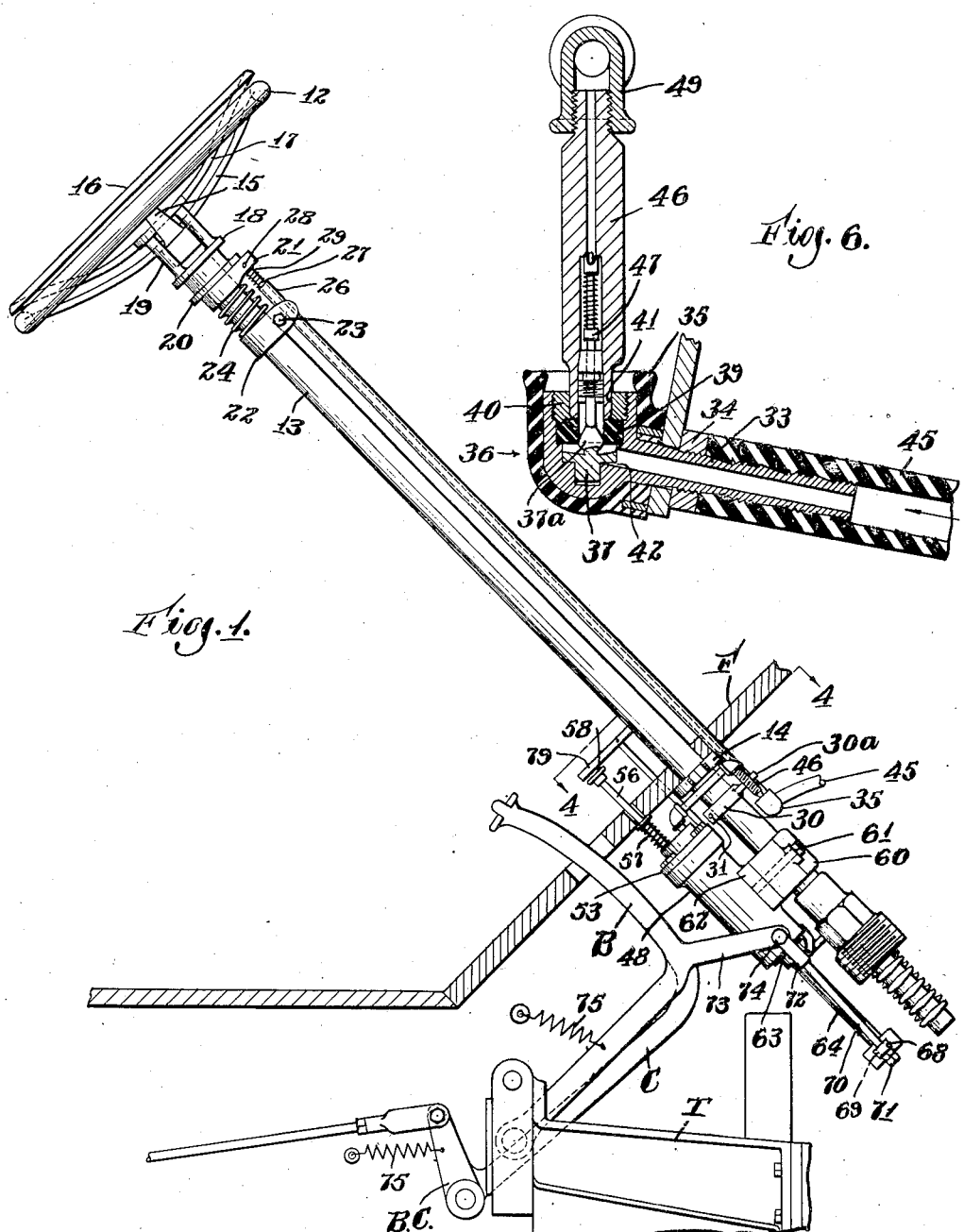

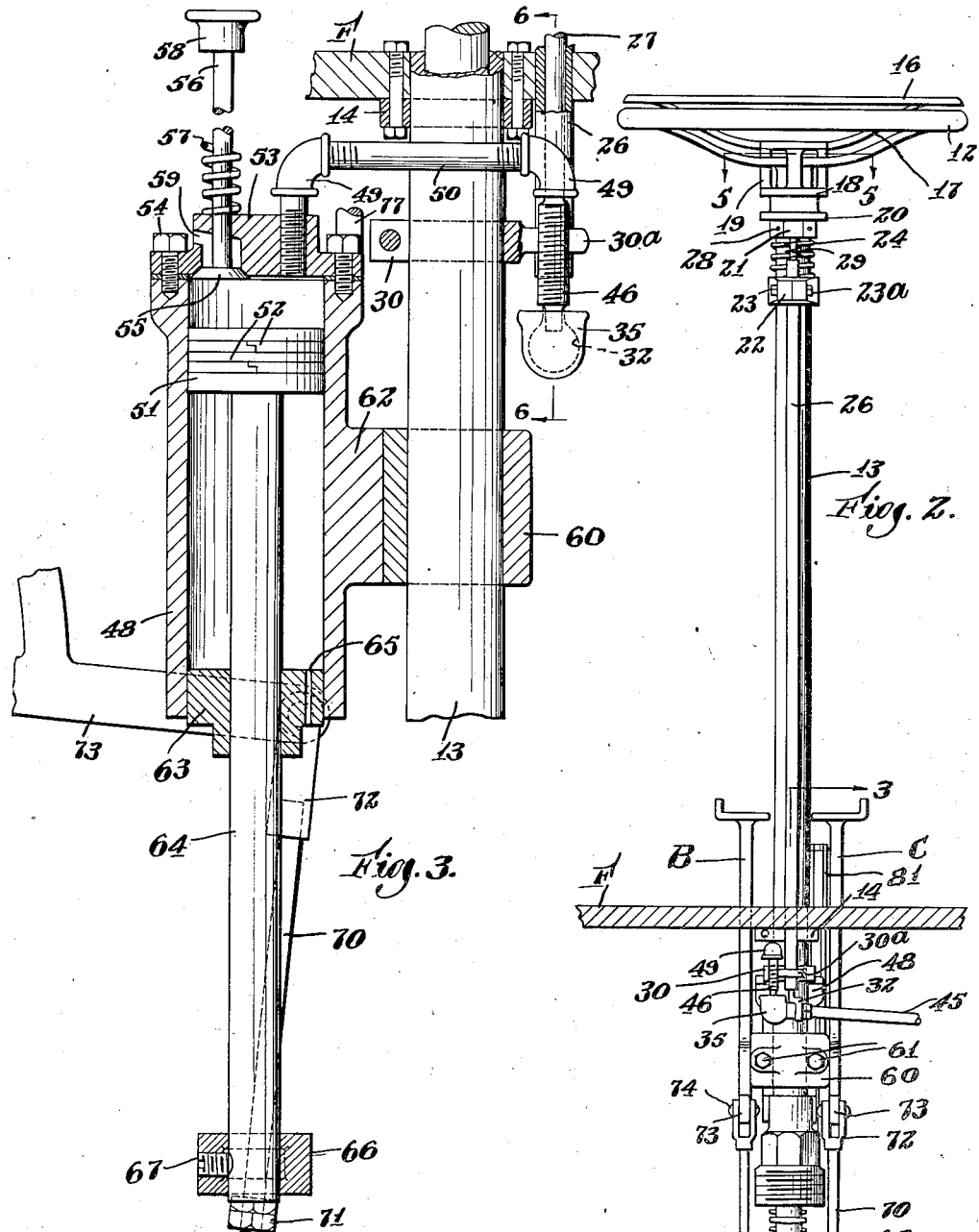

April 16, 1935.　　　J. W. WYLLIE　　　1,997,783
AUTOMATIC STOPPING DEVICE
Filed May 17, 1929　　　3 Sheets-Sheet 3
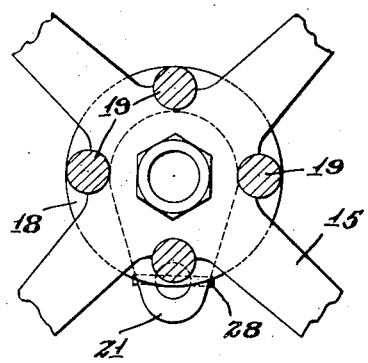
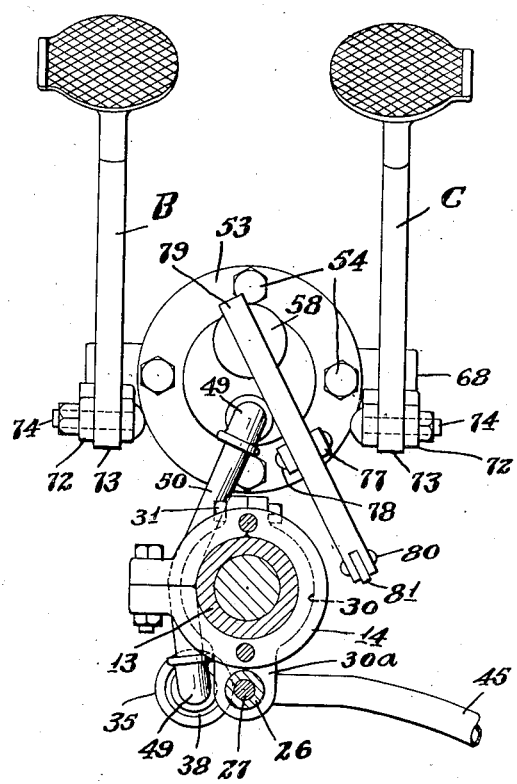
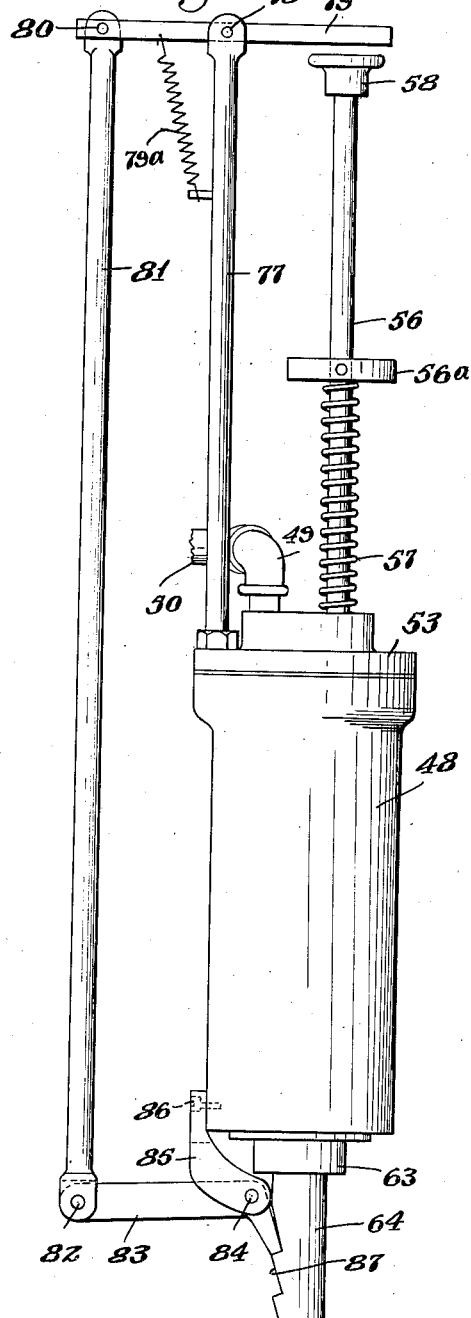
Inventor
John W. Wyllie
by Harold E. Cole
Attorney Patented Apr. 16, 1935

1,997,783

UNITED STATES PATENT OFFICE 1,997,783

AUTOMATIC STOPPING DEVICE

John W. Wyllie, Franklin, Mass.

Application May 17, 1929, Serial No. 363,967

6 Claims. (Cl. 180—82)

This invention relates to an automatic stopping device, more especially for use on automotive vehicles such as pleasure automobiles, trucks and buses.

Many accidents have occurred in automobile driving because of the collapse or temporary disability of the driver, while the vehicle is in motion, with disastrous and sometimes fatal results to him and his passengers. Incapacity of the driver may be due to organic diseases, such as heart trouble, or the sting of an insect, or merely fainting; but in every event the driver loses control of the vehicle and releases or loosens his hold on the steering wheel, with the result that the car continues in driverless fashion until it is stopped, usually by colliding with something or overturning.

I have found that the source of control for my automatic stopping device should be located on or adjacent the steering wheel so that the driver's hold on the steering wheel also holds my device, as the moment a driver becomes incapacitated his hands almost always slip off the steering wheel, and in the event that they do not slip off there is no gripping or holding action, and I have arranged my device so it will operate automatically to apply the brakes in either case. At the same time it is so constructed that it does not interfere with the normal operation of the vehicle and the normal application of the brakes.

With the above and other objects in view which will more readily appear as the nature of the invention is better understood, the same consists in the novel construction, combination and arrangement of parts hereinafter more fully described, claimed and illustrated in the accompanying drawings.

In the drawings:

Figure 1 is a side elevation of my automatic stopping device.

Figure 2 is a front elevation of my automatic stopping device.

Figure 3 is a section on line 3—3 of Figure 2.

Figure 4 is a plan cross section of line 4—4 of Figure 1.

Figure 5 is a plan cross sectional view on line 5—5 of Figure 2.

Figure 6 is a cross section of valve mechanism on line 6—6 of Figure 3, showing the parts in position to permit a flow of air to the cylinder.

Figure 7 is a rear side elevation showing safety mechanism to hold the brake and clutch down until the air in the cylinder is released.

Like numerals and letters of reference indicate corresponding parts in each figure.

As illustrated my device consists of a regular steering wheel 12 fitted on a steering post 13 fixed to the floor board F by a flange 14. Said steering wheel 12 has a spider 15 slightly above which the automatic control wheel 16 is located which also has a spider 17 and a ring-like piece 18 from which piece extend rods 19 below the steering wheel, which rods are connected to an upper slide 20. Under said upper slide 20 and in contact therewith is a sliding guide 21 having an extension piece or arm. Spaced below said sliding guide 21 is a guide collar 22 fixedly mounted or clamped on said steering post by means of a bolt 23 and a nut 23a. Between said sliding guide 21 and said guide collar 22 is a common compression spring 24. Fixedly mounted in a hole made in the projecting end of said guide collar 22 is a long tube 26 which extends from slightly above said guide collar to a point near the lower end of said steering post 13. An actuating rod 27 freely slides within this long tube 26, the upper end of which is mounted in a hole made in the arm of said sliding guide 21 and held thereby means of a rivet 28 driven through a hole made in said arm. Between the top edge of said long tube 26 and the lower edge of said arm is a small compression spring 29 which fits on said rod 27 and which serves as an equalizer. At the lower part of said steering post and below the floor board F is another or lower guide collar 30 having an extension piece 30a through which said tube 26 passes. This guide collar is clamped to said steering post 13 by means of a bolt 31 and nut.

At the end of said actuating rod 27 is fastened a projecting lug 32 having a hole therein through which extends a piece of hollow metal tubing or hose connection 33 which is held in place by a nut 34 and which extends into a housing member or chuck 35 in which is located a check valve 36 of common construction. This check valve 36 is composed of a cup-shaped valve seat 37, having a projecting point 37a projecting up through a soft rubber washer 39 in contact with a large nut 40 having a hole 41 therein, which nut forms a perfect seat. At one side of said valve seat 37 is a space 42 provided in the opening in the hose connection 33 to permit air to strike said valve seat 37 and force it against said rubber washer 39 immediately stopping the flow of air through said hose connection 33 as the operator takes hold of or compresses the control wheel 16. Said hose connection has a hose 45 connected to it, the other end of which is connected to any common form of air supply, not shown. Fitting into an opening at the top of said housing or chuck 35 is an ordinary valve stem 46. This valve stem 46, which extends slightly into said hole 41 in said nut 40, has the usual spring valve mechanism 47 such as is used in automobile tubes. While the vehicle is being driven the normal position of this valve stem is slightly spaced away from said check valve; but when the driver of the vehicle releases his hold on the control wheel said valve stem 46 and check valve 36, by means of a slight upward movement of said chuck 35 contact with each other and the air passes through. Said valve stem is connected to a cylinder 48, by means of two elbows 49 and a short length of pipe 50. Said cylinder is preferably of the air type having a piston 51 inside, said piston having two rings 52 near the top. A cover 53 for said cylinder is held tightly in place by bolts 54. Within said cylinder is a valve 55, the upper stem 56 of which projects above said cover 53 and is surrounded by a spring 57, and has a button 58 on which the operator presses his foot to permit air to escape through a hole 59 in said cylinder to thereby release the brakes after the automatic stopping device has been operated. The cylinder is held to the steering post by a split flange 60 and bolts 61, one part 62 of said split flange forming an integral part of said cylinder 48. Fitted into the bottom of said cylinder is a guide bushing 63 which encloses a piston rod 64 and serves to guide the stroke of the piston 51, which bushing has a vent hole 65 in it to permit the escape of air under the piston so it may move freely. At the end of said piston rod 64 is an end piece or yolk 66 which is fastened to it by means of a set screw 67. Said yolk 66 has wings 68 on each side provided with oversize holes 69 so that twin rods 70 connected to the clutch mechanism C and brake mechanism B, shown in Figure 1 of the drawings, may slide freely in them, thereby permitting the clutch and brake to be applied independently of my device in the normal operation of the vehicle. At the lower ends of said rods are two nuts 71 to keep said twin rods 70 in said holes. At the top of said twin rods 70 are turnbuckles 72 which are pivotally mounted to the extension arms 73 which form an integral part of the clutch C and brakes B by means of bolts 74 extending through holes provided in said turnbuckles 72 and said extension arms 73. The other ends of said clutch and brake members are fastened in the usual manner to the transmission T and to the bell crank BC pivoted to the chassis. Said clutch and brake members have springs 75 attached to them and fastened to the vehicle which springs serve to assist in returning the clutch and brake pedals to their normal position.

In Figure 7 of the drawings is shown the safety mechanism which is attached to the cylinder cover 53 by means of a bifurcated rod 77 tapped into said cover 53. Pivotally mounted on said rod 77 at 78 is a treadle 79 having a tension spring 79a connecting it to the bifurcated rod 77, and pivotally mounted at one end of said treadle 79 as shown at 80 is a long rod 81 extending to the bottom of said cylinder pivotally mounted as at 82 to a pawl or latching mechanism 83 which is pivoted as at 84 to a pivot support 85. This pivot support 85 is fastened to the cylinder by means of a bolt 86. This pawl 83 engages a ratchet 87 suitably formed on said piston rod 64.

It will be noted that in its normal position the pawl engages the ratchet 87, so that after the piston rod 64 has been forced downwardly it will be held there until the driver of the vehicle presses the treadle 79 thereby permitting the air to escape from the cylinder 48 followed by the return of the piston 51 and the piston rod 64 to their upper or normal position.

The operation of my device is as follows:

When the vehicle is being driven the driver has hold of the steering wheel 12 and also the control wheel 16, which hold presses said control wheel 16 downwardly. This pressure on the control wheel forces the actuating rod 27 downwardly, which keeps the chuck 35 and the check valve 36, which is within said chuck, away from the valve stem 46 so that no air may pass through into the cylinder 48.

Should the driver faint or collapse or because of the sting of an insect become distracted, his hold on the steering wheel and the control wheel is loosened or broken altogether, and as a result the control wheel springs upwardly a short distance thereby permitting the actuating rod 27 to move upwardly which raises said chuck 35 and check valve 36 so that it contacts with said valve stem 46 and the spring valve mechanism 47, thereby permitting a flow of air through the same to the cylinder 48. This air drives the piston 51 downwardly forcing the piston rod 64 downwardly at the same time, and as the yolk 66 and rods 70 are connected to said piston rod and also to the clutch and brake mechanism B and C, as shown in Figure 1 of the drawings, the clutch is thereby automatically thrown out and the brake applied, bringing the vehicle to a stop.

When it is desired to start the vehicle in motion again after the automatic device has been applied as described, the driver must press the treadle 79 to force the button 58 downwardly thereby opening the cylinder valve 55, so that the air within escapes permitting the piston to move upwardly to its original position, which movement returns the clutch and brake to their normal position. Of course, as the driver resumes his hold on the steering and control wheels no air can reach the cylinder because the valve stem and check valve are apart.

I claim as my invention:

1. An automatic stopping device for a vehicle comprising a control member, a rod member connected with said control member, a tube member connected with said control rod through which air may pass, cylinder and piston means operatively connected with said tube member adapted to be actuated by the pressure of air to apply the brake member of said vehicle and bring it to a stop.

2. An automatic stopping device for a vehicle comprising a control member adapted to be held by the operator in conjunction with his hold on the steering apparatus of said vehicle, a movable rod member adapted to be actuated by the movement of said control member, tubing connected to said movable rod member and to an air supply, cylinder and piston means connected to said tubing, valve mechanism to which said tubing is adapted to be brought into contact with to permit air to pass through said cylinder and drive said piston when the operator's hold on said control member is loosened, said piston being operatively connected with the brake member of said vehicle so that the driving of said piston applies said brake member to bring the vehicle to a stop.

3. An automatic stopping device for a vehicle comprising a control wheel adjacent the steering member of said vehicle and adapted to be held by the operator in conjunction with his holding of said steering member, sliding means connected to said control wheel, a guide collar normally in contact with said slide, a spring between said slide and said guide collar, an actuating rod connected to said sliding means, hose connecting means attached to said actuating rod, a housing and a valve connected to said hose connecting means, a valve stem embodying valve mechanism which is normally spaced away from said first-mentioned valve, said first-mentioned valve being adapted to be brought in contact with said valve mechanism when the operator's hold on said control wheel is loosened, a cylinder embodying a piston, a conduit connecting said valve stem to said cylinder, a valve for said cylinder, a piston rod connected with said piston, means connected with said piston rod and the brake member of said vehicle adapted to be actuated when the hold of the operator on said control wheel is loosened so as to apply said brake member to bring the vehicle to a stop.

4. An automatic stopping device for a vehicle comprising a control wheel adjacent the steering wheel of said vehicle and adapted to be held by the operator in conjunction with his holding of said steering wheel, sliding means connected with said control wheel, an actuating rod operatively connected to said sliding means, a hose connection attached to said actuating rod and connected to an air supply, said hose connection embodying valve mechanism, a valve stem embodying valve means spaced away from said valve mechanism in the normal driving position, said valve mechanism and said valve means being adapted to contact with each other when the operator's hold on said control wheel is loosened, a cylinder having a piston therein, a conduit connecting said cylinder to said valve stem, a piston rod connected to said piston, sliding mechanism connected to said piston rod and the brake of said vehicle whereby the actuation of said piston rod applies the brake to bring the vehicle to a stop.

5. An automatic stopping device for a vehicle comprising a control wheel adjacent the steering apparatus of said vehicle and adapted to be held by the operator in conjunction with his holding of said steering apparatus, sliding means connected with said control wheel, valve actuated means operatively connected to said sliding means, a hose connection embodying valve mechanism connected to said valve actuated means and also connected to an air supply, a valve stem embodying valve means spaced away from said valve mechanism in its normal position when the vehicle is being driven, said valve mechanism being adapted to contact with said valve means when the operator's hold on said control wheel is loosened, a cylinder having a piston and a valve therein, conduit means connecting said cylinder to said valve stem, a piston rod connected to said piston, a yolk attached to said piston rod having a hole therein, a rod slidably mounted in said hole, means connecting said sliding rod to the brake member of said vehicle so that said brake member may be applied independent of any movement of said piston rod, said last-mentioned means being otherwise connected to said brake member so that when said valve mechanism and valve means contact the resulting movement of said piston rod applies the brake member to bring the vehicle to a stop.

6. An automatic stopping device for a vehicle comprising a control wheel adjacent the steering wheel of said vehicle and adapted to be held by the operator in conjunction with his holding of said steering wheel, a slide and rods connecting said control wheel to said slide, a sliding guide normally in contact with said slide, a guide collar mounted on the steering post of said vehicle, a spring located between said sliding guide and said guide collar, a tube passing through said guide collar to a point near the lower end of said steering post, an actuating rod adapted to move freely within said tube and connected to said sliding guide, a lug connected to said rod at its lower end, a hose connection, a housing member embodying a check valve into which housing member said hose connection extends, said hose connection being adapted to be connected to an air supply, a valve stem spaced away from said check valve in its normal position when said vehicle is being driven, said check valve being adapted to contact with said valve stem when the operator's hold on said control wheel is loosened, a cylinder having a piston within, conduit means connecting said cylinder to said valve stem, a valve in said cylinder, a piston rod connected with and extending below said piston, a yolk attached to said piston rod, rods slidingly mounted in said yolk and attached to the clutch and brake members of said vehicle, turnbuckles attached to the clutch and brake bars of said vehicle whereby the actuation of said piston rod moves the clutch and brake members to thereby bring the vehicle to a stop.

JOHN W. WYLLIE.